United States Patent

Blake et al.

[15] 3,665,113

[45] May 23, 1972

[54] TELEPHONE REPERTORY DIALER

[72] Inventors: Richard K. Blake, Athens; Robert J. deHilster; Warren Wesley Porter, both of Galion, all of Ohio

[73] Assignee: North Electric Company, Galion, Ohio

[22] Filed: Aug. 25, 1969

[21] Appl. No.: 852,661

[52] U.S. Cl. .......... 179/90 B, 179/90 CS

[51] Int. Cl. .......... H04m 1/45

[58] Field of Search .......... 179/90 BD, 90 B, 90 K, 90 AD

[56] References Cited

UNITED STATES PATENTS

| | | | |
|---|---|---|---|
| 3,510,602 | 5/1970 | Leyburn | 179/90 |
| 3,440,357 | 4/1969 | Broekhuysen | 179/90 |
| 3,422,229 | 1/1969 | Wallace | 179/90 |
| 3,417,207 | 12/1968 | Pecota | 179/90 |
| 3,341,666 | 9/1967 | Wallace | 179/90 |
| 3,555,201 | 1/1971 | Kuehnle | 179/90 B |
| 3,538,263 | 11/1970 | Midas | 179/90 B |
| 3,441,685 | 4/1969 | Wallace | 179/90 B |

*Primary Examiner*—Kathleen H. Claffy
*Assistant Examiner*—Tom D'Amico
*Attorney*—Johnson, Dienner, Emrich, Verbeck & Wagner

[57] ABSTRACT

A solid state telephone repertory "dialer" including circuitry for generating pulses representative of the various digits in a selected directory number to be dialed, and directory number storage apparatus for routing the pulses over conductors representative of given digit values to circuitry which generates multifrequency digital signals representative of the digits of the selected directory number for use in setting up a communication path.

13 Claims, 12 Drawing Figures

INVENTORS
RICHARD K. BLAKE
ROBERT J. deHILSTER
WARREN W. PORTER

BY Dixon Jackson Bottcher & Dunne
ATTORNEYS

INVENTORS
RICHARD K. BLAKE
ROBERT J. deHILSTER
WARREN W. PORTER

BY Brown Jackson Boettcher & Dienner
ATTORNEYS

INVENTORS
RICHARD K. BLAKE
ROBERT J. deHILSTER
WARREN W. PORTER

BY Brown, Jackson, Boettcher & Dienner
ATTORNEYS

INVENTORS
RICHARD K. BLAKE
ROBERT J. deHILSTER
WARREN W. PORTER

BY [signature]
ATTORNEYS

INVENTORS
RICHARD K. BLAKE
ROBERT J. deHILSTER
WARREN W. PORTER

BY [signature]
ATTORNEYS

*INVENTORS*
RICHARD K. BLAKE
ROBERT J. deHILSTER
WARREN W. PORTER

BY *Brown, Jackson, Boettcher & Dienner*
*ATTORNEYS*

P-419-468-8549

INVENTORS
RICHARD K. BLAKE
ROBERT J. deHILSTER
WARREN W. PORTER

BY Brown Jackson Boettcher & Dienner

ATTORNEYS

INVENTORS
RICHARD K. BLAKE
ROBERT J. deHILSTER
WARREN W. PORTER

BY Brown Jackson Boettcher & Dienner

ATTORNEYS

Patented May 23, 1972

3,665,113

9 Sheets-Sheet 9

INVENTORS
RICHARD K. BLAKE
ROBERT J. deHILSTER
WARREN W. PORTER

BY

ATTORNEYS

TELEPHONE REPERTORY DIALER

BACKGROUND OF THE INVENTION

The invention herein described was made in the course of or under a contract or subcontract therein with the Department of the U.S. Air Force.

1. Field of the Invention

This invention relates to telephone subscriber apparatus and more particularly to a repertory dialer.

2. Description of the Prior Art

Automatic telephone call transmitters which enable subscribers to initiate calls by a minimum of mechanical manipulation, for example, by depressing a single key, are known as repertory dialers. Basically, such apparatus comprises storage or memory means which are selectively operable responsive to the depression of a single key or pushbutton to issue signals which represent a directory number corresponding to the single key depressed.

SUMMARY OF THE INVENTION

This invention discloses a telephone repertory "dialer" in which, when a single key is depressed, a plurality of pulses, one for each digit of a selected directory number, are generated and are passed to a mechanical storage module, which has a separate input for each pulse, an output for each possible digit value, and means for connecting each input to a predetermined output. The storage module thus assigns a digit value to each pulse, and the digit pulses are routed through the module to a digit decoder and a multi-frequency oscillator whereby dual-frequency signals, representative of each digit of the directory number selected to be "dialed," are consecutively generated and sent to a switching center.

The repertory "dialing" system of the present invention greatly reduces the size of a subscriber instrument by using compact mechanical storage modules for the storage of directory numbers to be dialed and electronic means for accessing the storage modules.

Moreover, since it is desirable that the storage module be alterable so that an old stored number can be changed to a different number, the system of the present invention incorporates mechanically alterable storage modules for storing directory numbers whereby the number can easily be changed.

BRIEF DESCRIPTION OF THE DRAWINGS

FIGS. 1, 2 and 3 are to be arranged.

DESCRIPTION OF A PREFERRED EMBODIMENT

Figure 1:
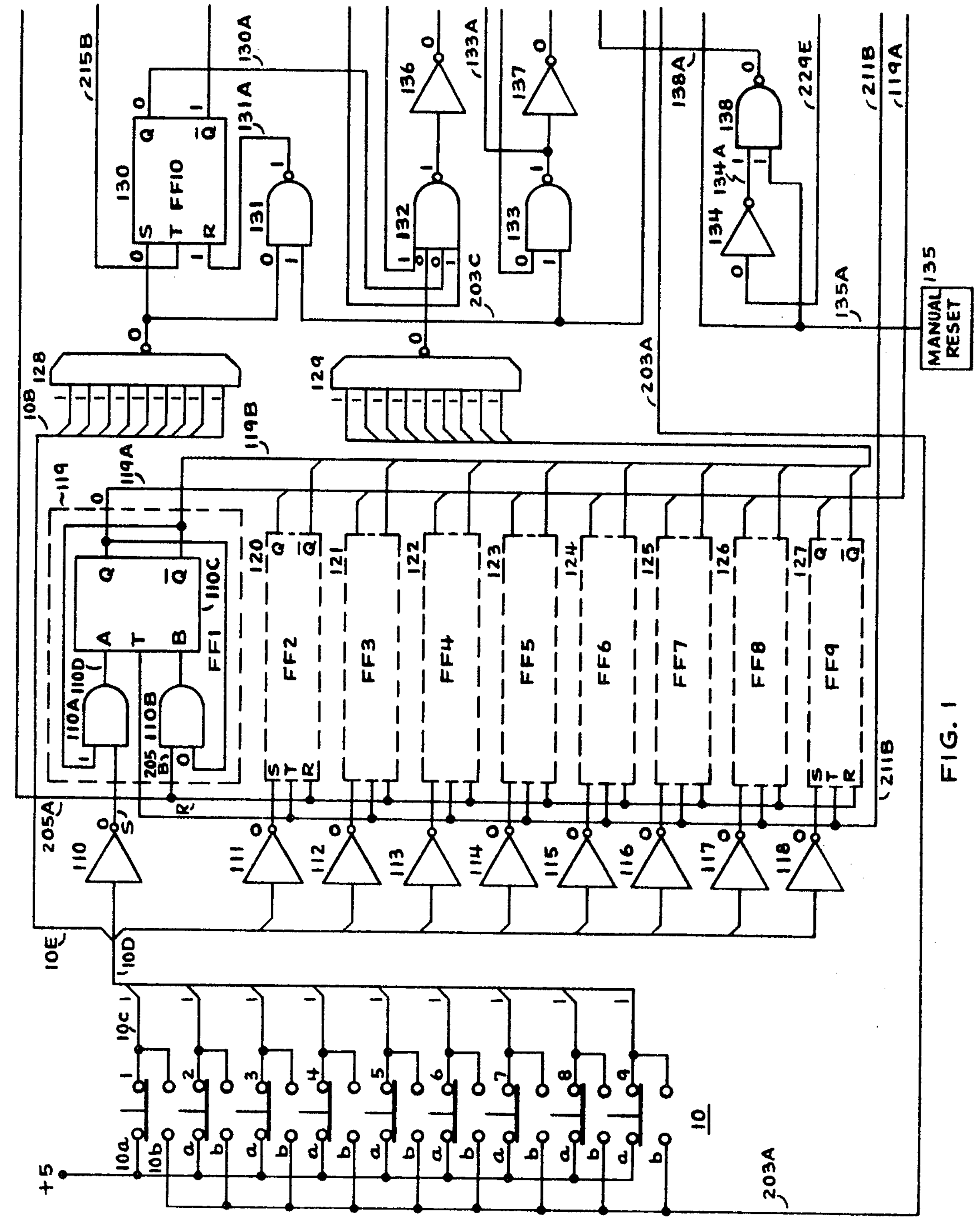
FIGS. 1 and 2 are a schematic circuit diagram of a pushbutton array and control logic pulse generating circuits controlled by the pushbuttons of the repertory dialing system of FIG. 1A.
Figure 1A:
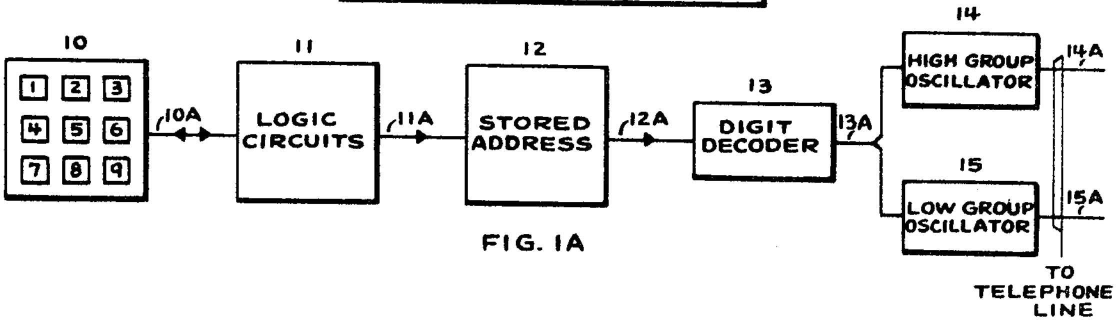
FIG. 1A is a schematic block diagram of a repertory dialing system according to the present invention.

FIG. 1A is a functional block diagram of an embodiment of a repertory dialing system provided by the present invention. In this system, depression of any one of the pushbuttons 1–9 of pushbutton unit 10 will cause the generation of signals representative of an entire directory number associated with the pushbutton. In accordance with an embodiment of this abbreviated dialing system described, nine directory numbers, each comprised of as many as 14 digits, may be generated. It is apparent that more numbers can be generated or the number of digits of a number increased by adding the equipment needed.

The pushbutton unit 10 is connected by a cable 10A to control and pulse generating logic circuits 11 which generate fourteen time-displaced pulses, one for each digit of the directory number. These pulses pass over cable 11A to programmable storage apparatus 12 which includes nine mechanically alterable matrix arrays shown in FIG. 3, one associated with each of the nine pushbuttons of unit 10. Each matrix array is disposed to route up to fourteen of the fourteen pulses generated in response to depression of a pushbutton associated therewith to a digit decoder 13 connected to the output of the storage apparatus 12 by cable 12A. Decoder 13 is responsive to pulses received at its inputs to selectively energize oscillators 14 and 15 to generate dual-frequency signals in accordance with the routing of the pulses to the decoder which represent a particular digit for each of up to 14 pulses. These multi-frequency signals are sent to the switching system over conductors 14A and 15A of a telephone.

Figure 8:
FIG. 8 shows how
Figure 2:
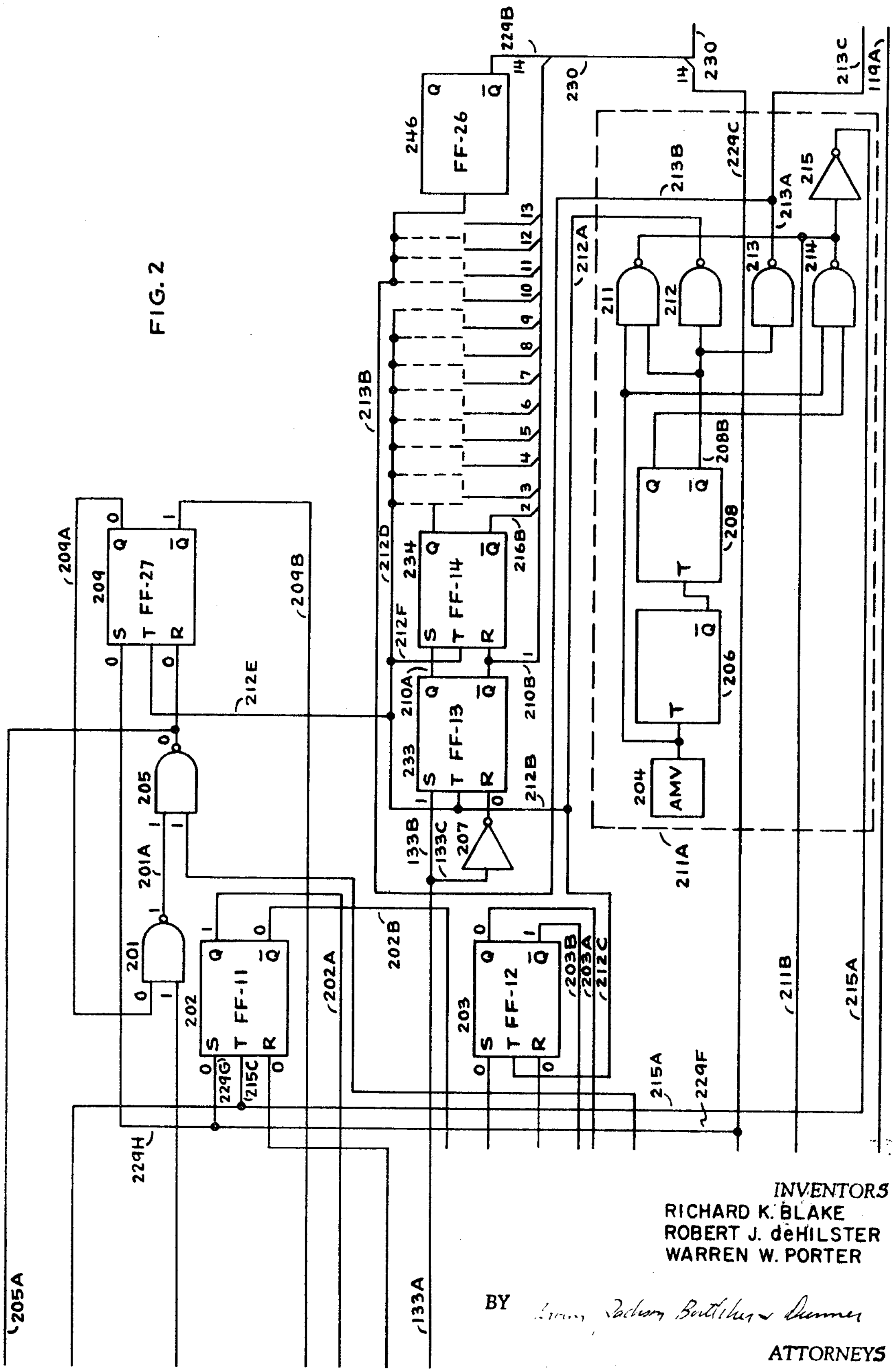
Figure 3:
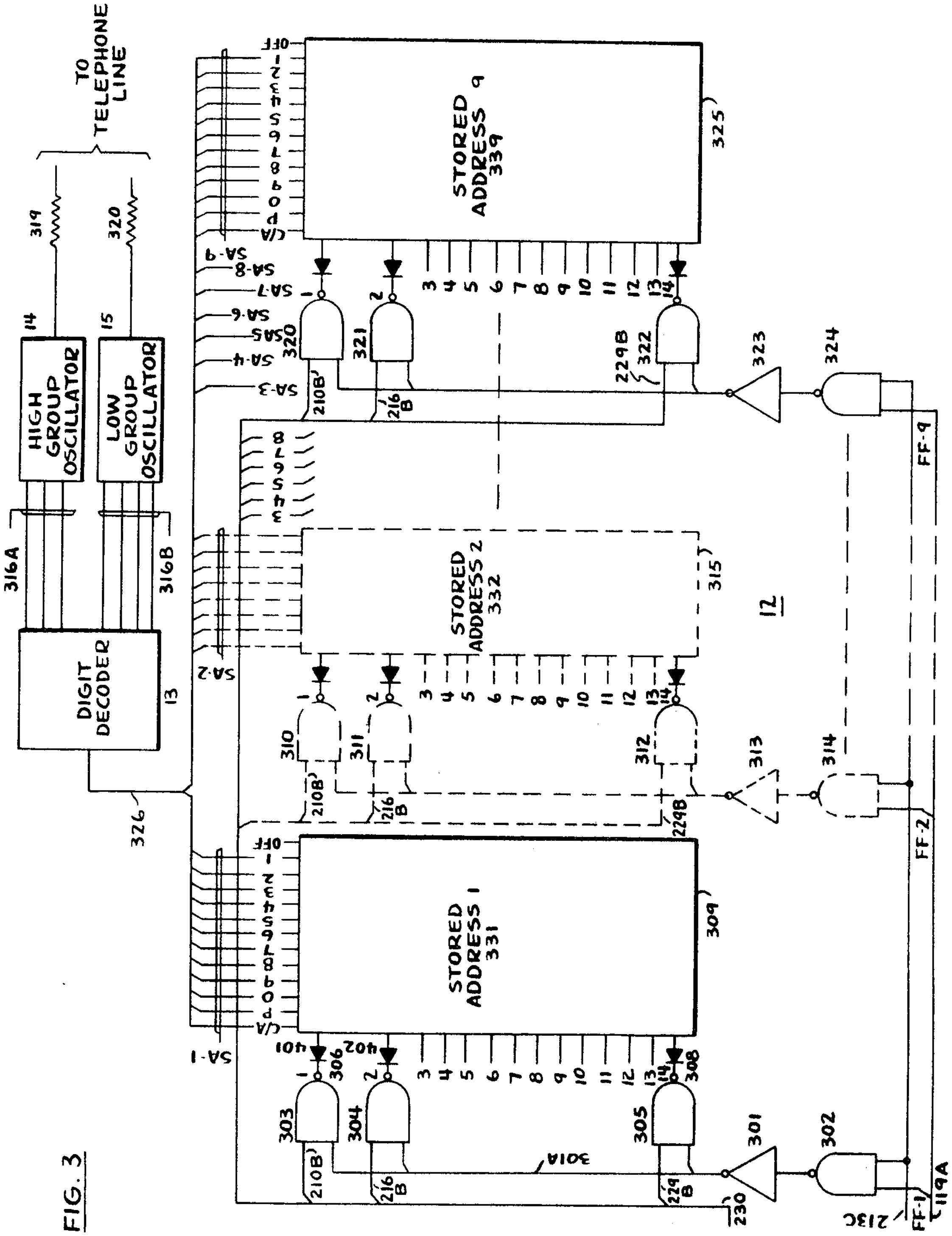
FIG. 3 shows schematically nine directory number storage modules and access circuitry for routing the pulses generated by the control logic to a digit decoder and multi-frequency oscillator circuit for generating multi-frequency signals representative of digits of a given directory number.

More specifically, with reference to FIGS. 1–3, assembled as shown in FIG. 8, the manner for generating a complete directory number will be described. FIGS. 1–3 are a schematic diagram of the system shown in block form in FIG. 1A and includes pushbuttons 10, control logic 11, storage address module 12, digit decoder 13 and oscillators 14 and 15.

To dial a complete directory number, the subscriber depresses a pushbutton of the pushbutton unit 10, shown in schematic form in FIG. 1, which is assigned to a particular directory number sought. For purposes of illustration, it is assumed the pushbutton marked as number 1 is depressed and that the number to be reached is P–419–468–8549, where the digit "P" stands for a priority call command.

When pushbutton 1 is depressed, its contact **10*b* is closed and contact 10*a* is opened. Consequently, a plus 5 volts, or logic 1 level, is removed from lead 10C which is connected over cable 10D to the input of inverter 110, and a ground, or logic 0 level, present on lead 203A, is extended over lead 10C and cable 10D to the input of inverter 110. Logic levels have been marked at various points in FIGS. 1–3** and are indicative of the logic levels under normal conditions, that is, when none of the pushbuttons are depressed.

In response to the grounding of the input of inverter 110 when it becomes connected to lead 203A, the output of inverter 110 becomes a logic 1. The logic 1 output of inverter 110 is extended to an input of AND gate **110*a*, which provides the set input A of flip-flop 119, one of nine flip-flops, 119–127**, which are individually associated with one of the pushbuttons.

Each of the flip-flops 119–127, such as flip-flop 119 are J-K flip-flops and operate as such, the operation of which is well known, comprising a pair of input AND gates 110A, 110B and a bistable circuit 110C which has a set input A, a reset input B, a timing pulse input T, a positive output Q, and a negative output $\overline{Q}$. The flop 119 is set by applying a logic 1 to gate 110A whereby when the clock pulse on input T changes from logic 1 to logic 0 (i.e. the trailing edge) the setting is effected. It should be understood that the clock pulse on input T of the various J-K flip-flops effects their operation on the trailing edge thereof. The output of gate 110A is connected over lead 110D to the set input A of circuit 110C. By setting of a flip-flop, it is meant that the positive output Q will be at a +5 volts or logic 1 level, and the negative output $\overline{Q}$ will be at ground or logic 0 level. One input of gate 110A is connected to the output of inverter 110 and a second input of gate 110A is connected to the negative output $\overline{Q}$ of the flip-flop 119.

A second AND gate 110B which provides a reset input R of flip-flop 119 has its output connected to the reset input B of circuit 110C. One input of gate 110B is connected to the positive output Q of the flip-flop 119 and a second input of gate 110B is connected over leads 205B and 205A to the output of NAND gate 205 (FIG. 2) which provides a reset signal as will be described hereinafter.

Figure 1B:
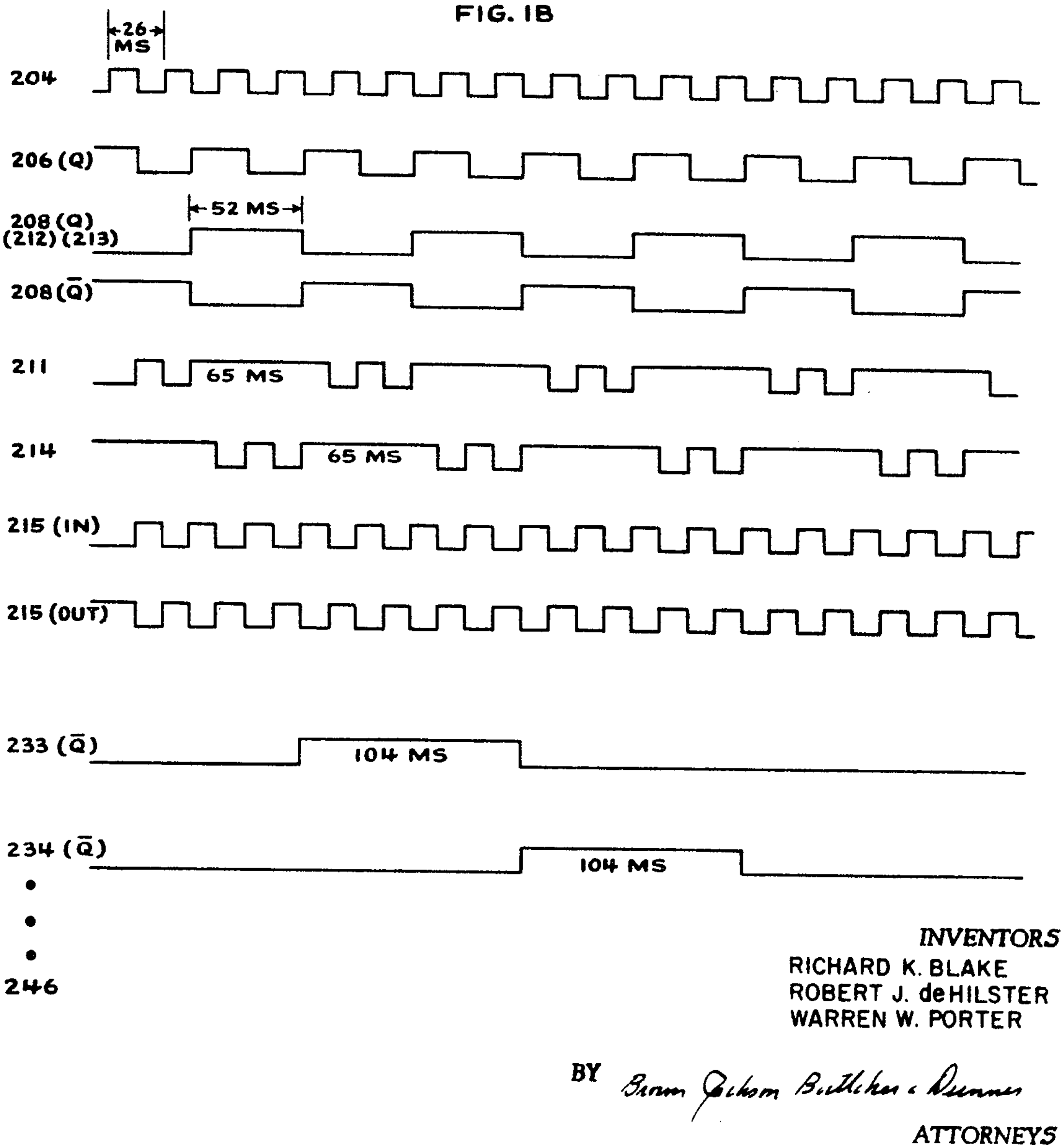
FIG. 1B is a timing diagram which shows the relationships between clock pulses which synchronize the operation of the system of FIG. 1A.

In addition to the set and reset inputs of flip-flops 119–127, each flip-flop also has a timing pulse input T connected to a timing pulse generator circuit 211a (FIG. 2) over lead 211B. The waveforms of this circuit are shown in FIG. 1B.

The timing generator circuit 211*a* which is used to synchronize the operation of the logic gates and flip-flops of the system, includes an astable multivibrator 204 which produces a pulse which is 13 ms. on and 13 ms. off. The output of the astable multivibrator is connected to a flip-flop 206, the negative output of which is connected to a second flip-flop 208. Flip-flops 206 and 208 are connected to divide the pulse rate by four, and accordingly, a pulse 52 ms. on and 52 ms. off is provided at the output of flip-flop 208. The 13 ms. and 52 ms. pulses are gated together via NAND gates 211–214 to provide three different pulse trains shown in FIG. 1B (third, seventh, and eighth from top) on a comparative time base, which are conducted to flip-flops and logic gates of the system to synchronize the operation of these logic elements. Gates 211, 212, 213, and 214 are put in the system to avoid clock skew. The output of gates 211 and 214 are combine to give an output on lead 211B and also as an input to inverter 215 which is the same frequency as the output of 204 but without clock skew. Gates 212 and 213 provide for two distributions of a lower frequency generated by flip-flop 208. The delay through NAND gates 212 and 213 also prevents clock skew.

Thus, when the pushbutton 1 is depressed, the logic 1 output of inverter 110 at an input of gate 110A, the set input of flip-flop 119, causes gate 110A to be enabled whereby flip-flop 119 becomes set when a timing pulse is received over lead 211B from timing circuit 211*a*, and a logic 1 to be present at output Q of flip-flop 119.

The negative outputs $\overline{Q}$ of all the flip-flops 119–127 are individually connected to one of nine inputs of a NAND gate 129 via cable 119B, and thus, the logic 0 present at negative output of flip-flop 119 is extended to an input of gate 129, causing gate 129 to be disabled and its output becomes a logic 1. The output of gate 129 is connected to an input of NAND gate 132.

The logic 0 on lead 203A is also extended, via contact 10*b* pushbutton 1, lead 10C and cable 10E, to an input of NAND gate 128 causing gate 128 to be disabled. The output of gate 128 which is connected to the set input of a flip-flop 130, going to a logic 1 sets the flip-flop 130 when a timing pulse is received over leads 215B and 215A from gate 214, via inverter 215, and a logic 1 appears on lead 130A which connects the positive output Q of flip-flop 130 to a second input of gate 132.

Two other inputs to gate 132 are also at logic 1 levels, and accordingly, gate 132 is enabled. The output of gate 132, inverted by inverter 136, is extended to the reset input R of flip-flop 202 which causes flip-flop 202 to be reset when a timing pulse is received over leads 215A and 215C from gate 214 via inverter 215.

The positive output Q of flip-flop 202 is connected over lead 202A to one of the inputs of NAND gate 132, and when flip-flop 202 is reset, gate 132 is disabled, removing the reset signal from the reset input R of flip-flop 202. The negative output $\overline{Q}$ of flip-flop 202 is connected over lead 202B to an input of NAND gate 133, and when flip-flop 202 is reset, a logic 1 level presented on lead 202B causes gate 133, the second input of which is also a logic 1, to be enabled.

The output of gate 133 is connected to the set input S of flip-flop 203 through inverter 137, and when gate 133 is enabled, flip-flop 203 is set when a timing pulse is received over leads 212C and 212A from gate 212.

The negative output $\overline{Q}$ of flip-flop 203 is connected over lead 203B to one of the inputs of gate 133. When flip-flop 203 is set, a logic 0 or ground is placed on lead 203B causing NAND gate 133 to be disabled.

Moreover, the negative output $\overline{Q}$ of flip-flop 203 is also connected over conductors 203B and 203C to an input of gate 131 and the ground on this level will cause gate 131 to be disabled. The output of gate 131 is connected over lead 131A to the reset input R of flip-flop 130 and when gate 131 is disabled, the logic 1 level at its output conducted to flip-flop 130 will cause flip-flop 130 to be reset when the timing pulse is received over lead 215B.

The output of gate 133 is also connected via lead 133A to the pulse generating portion of the logic circuitry comprising fourteen flip-flops 233–246 which generate 14 time-spaced pulses which represent the various digits in a directory number to be dialed. By using more or fewer flip-flops, the number of pulses and consequently the number of digits dialed can be increased or decreased.

The logic 0 level present at the output of gate 133 when it is enabled is passed to the reset input R of flip-flop 233 through inverter 207 causing flip-flop 233 to be reset at time of receipt of the next timing pulse from gate 212 over leads 212A, 212B. When flip-flop 233 is reset, a logic 1 level, or plus five volts, will be present on its negative output $\overline{Q}$ and also on lead 210B. The incoming clock pulse on lead 212B is 52 ms. on and 52 ms. off, and accordingly, flip-flop 233 will remain reset for 104 ms., and a 104 ms., 5 volt pulse will appear on lead 210B.

The positive output Q of flip-flop 233 is connected directly to the set input of flip-flop 234 and the negative output $\overline{Q}$ of flip-flop 233 is connected to the reset input R of flip-flop 234. The logic 1 level will also be conducted to the reset input R of flip-flop 234 causing flip-flop 234 to be reset with the next clock pulse over lead 212F. When flip-flop 234 is reset, the logic 1 level, or five volt pulse, at its negative output is passed via lead 216B to cable 230 delayed in time from the pulse output of flip-flop 233. Referring to FIG. 1B, it can be seen that flip-flop 234 is rest at the same time that flip-flop 233 becomes set.

The other twelve flip-flops 235-246 are similarly connected in tandem with flip-flops 233 and 234 with their positive output Q and negative output $\overline{Q}$ connected to the set input S and reset input R of a succeeding flip-flop. Thus flip-flops 235–246 will also be set and reset in succession so that 14 contiguous time-spaced pulses of 104 ms. duration are generated and passed over cable 230 which carries fourteen conductors which connect the outputs of the fourteen flip-flops (13–26) to matrix access logic gates such as gates 302, 304 and 305. The pulses will be routed through one of the stored address modules as will be described hereinafter to cause fourteen dual-frequency tones to be generated by oscillators 14 and 15.

Digressing for a moment, while the fourteen pulses are being generated by the fourteen flip-flops 233–246, an inhibit signal, the positive output Q of flip-flop 203, is extended back over lead 203A to the contacts, such as contact 10*b*, of all of the pushbuttons 1–9 of pushbutton unit 10. As long as the logic level 1 appears on lead 203A, depressing any of the pushbuttons will not produce the changes in the logic circuits 12 necessary to provide control signals to cause a subsequent train of pulses to be generated. Flip-flop 203 will be set and the inhibit removed after the 14 pulse is generated and routed through the storage modules 12.

The fourteenth pulse which is generated by flip-flop 246 is also passed via lead 229B, cable 230 and lead 229C to the input of inverter 134 where the logic 1 level is converted to a ground level disabling NAND gate 138 and causing a logic 1 level to be established on lead 138A causing flip-flop 203 to be reset with the receipt of the next timing pulse over lead 212C.

Similarly, the logic 1 level on lead 229C is extended via leads 229F, 229G to flip-flop 202 causing flip-flop 202 to be set, when a timing pulse is received, and returned to its normally idle state.

In addition, the output of flip-flop 246 is further connected via leads 229C, 229F and 229H to the set input S of flip-flop 209. When a timing pulse is received over leads 212A and 212B from gate 212, flip-flop 209 is set and a logic 1 level, provided on positive output Q, is extended over lead 209A to an input of NAND gate 201. A second input of gate 201 is also at a logic 1 level, and gate 201 is enabled. The grounded output of gate 201 is extended over lead 201A to gate 205, causing gate 205 to be disabled and a logic 1 to be present on leads 205A and 205B which are connected to the gate 110B, at the reset input R of flip-flop 119, causing flip-flop 119 to be reset when the next timing pulse is received over lead 211B.

At this point, the logic control elements have all been reset to their normally idle condition. It is pointed out that the clock pulses synchronize the setting and resetting of the flip-flops, so that the gates will not be reset until after the 14th pulse has been generated and routed through the storage modules 331–339.

A manual reset 135 is also provided to reset the input control flip-flops 119–127 and flip-flop 203. The manual reset 135 provides aground on lead 135A, which through gate 205 resets flip-flops 119–127, and via gate 138 resets flip-flop 203.

The fourteen pulses generated by the logic circuits 11 are routed via one of nine digit storage modules 331-339, each of which is individually associated with one of the nine pushbuttons of pushbutton unit 10, accessed through storage access logic gates including gates 303–305 and 302; 310–312 and 314; etc., to digit decoder 13 which energizes the oscillators 14 and 15 to generate a dual-frequency signal which represents a given digit for each of the 14 pulses.

From the foregoing, it should be apparent that additional directory numbers can be provided by adding additional pushbuttons to the array 10, additional storage modules 12, control logic including a flip-flop, such as 119, an input to gates 128 and 129, and access gates such as 310–312 and 302 for each number to be added.

The outputs of each of the control flip-flops 119-127 (FIG. 1) are individually connected to matrix access gates, such as gates 302, 314 and 324, via cable 119A. For example, the output of flip-flop 119 is connected to gate 302 which is associated with pushbutton 1. The output of flip-flop 120 is connected to gate 314, and the output of flip-flop 127 is connected to gate 324.

Since in the present example, it has been assumed pushbutton 1 was depressed, flip-flop 119 is set, and a logic 1 appears on lead 119A. The output of flip-flop 119 is connected to an input of NAND gate 302. A second input to gate 302 is a 52 ms. clock pulse received over leads 213A and 213C from gate 213. Each time a clock pulse is received at the input of gate 302 coincident with the presence of a logic 1 on lead 119A from the output of flip-flop 119, the output of gate 302 becomes logic 0, and the output of inverter 301 becomes a logic 1. The output of inverter 301 is connected to an input of each of the NAND gates, including gates 303, 304, and 305, connected to stored address module 331. Gates, such as gates 303–305, serve to gate each of the 14 pulses to one of the 14 conductors, input to the storage module 331. The appearance of the logic 1 on lead 301A which connects the output of inverter 301 to the inputs of these gates, coincident with the arrival of the pulse output of flip-flop 233 over conductor 210B, and cable 230 will cause the output of gate 303 to be ground.

Digressing, the outputs of the fourteen pulse generating flip-flops 233–246 are individually connected over cable 230 to 14 NAND gates, such as gates 303, 304, and 305, at the input to each of the stored address modules 331–339. Thus, for example, the $\overline{Q}$ output of flip-flop 233 is connected to gate 303 via lead 210B and cable 230, the $\overline{Q}$ output of flip-flop 234 is connected to gate 304 via lead 216B and cable 230, and the $\overline{Q}$ output of flip-flop 246 is connected to gate 305 via lead 229B and cable 230. The first pulse of the train of 14 pulses is fed to gate 303, the second pulse of the pulse train is fed to gate 304, etc., and the last pulse is fed to gate 305. It should be noted that the first pulse on lead 210B is fed to the first of the nine gates such as 303, 310, . . . 320 associated with the nine modules, that the second pulse on lead 216B is fed to the second of the nine gates such as 304, 311, . . . 321, etc., but that only the module whose gate such as 302 has been affected by the associated pushbutton will conduct pulses.

The ground potential at the output of gate 303 is presented to storage module 331 over its first incoming lead 401 through a diode 306. Similarly, when the second of the fourteen pulses appears via lead 216B, at an input of gate 304, a logic 0 is presented over a second lead 402. The remaining 12 incoming pulses will also be gated through individual logic gates by the logic 1 pulse output of inverter 301 with the 14th pulse being gated through NAND gate 305.

Figure 4:
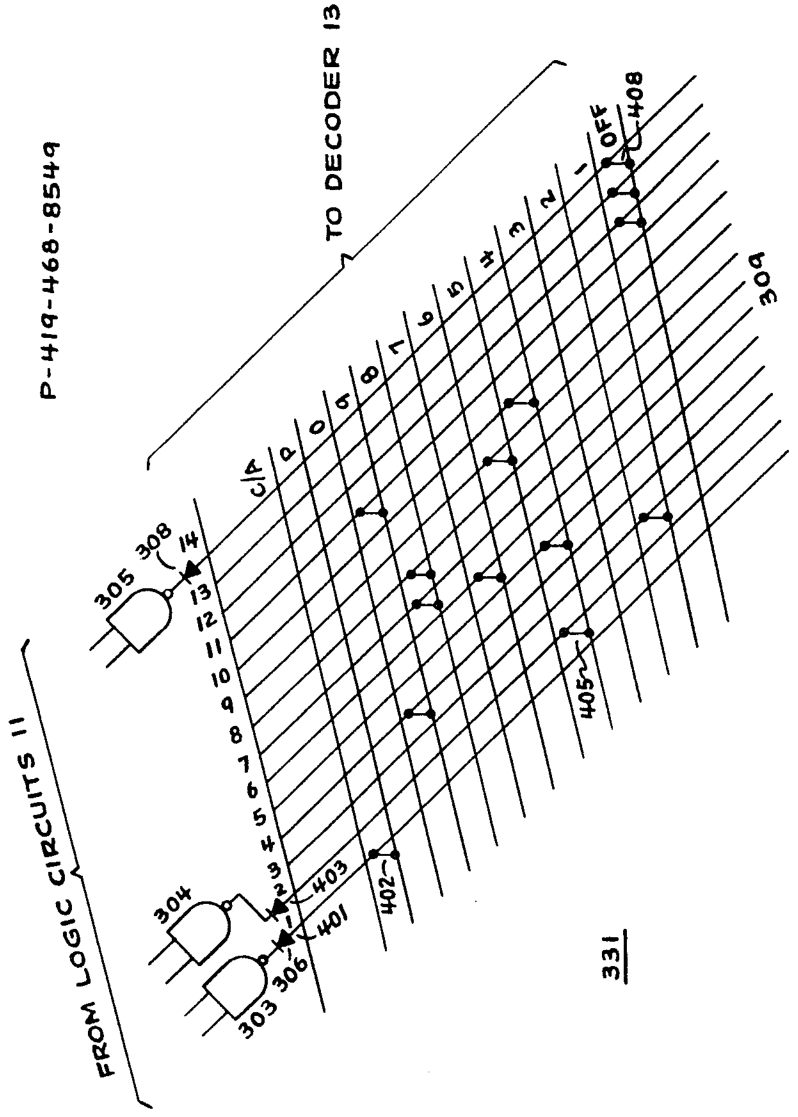
FIG. 4 shows schematically how digit pulses are routed through a directory number storage module.

FIG. 4 shows in schematic form how a pulse gated through the access gates, such as gates 303, 304 and 305 may be routed through a matrix formed by the two orthogonal sets of parallel conductors of a digit storage module 331 whereby the pulses from the output of the logic circuits 11 are routed to a digit decoder 13 with the 14 pulses from the logic circuits appearing in a predetermined sequence over conductors designated 1–0, for the digits, and command signal P for priority, to correspond to the values of the digits of a predetermined directory number and priority command as required. The C/A lead has no function in the present application.

Digit decoder 13 (FIG. 3) has 12 inputs over cable 326, one for each possible digit or command pulse to be received from the output of the storage module. The digit decoder 13 has three conductors in path 316A to the high group oscillator 14, each conductor representing a different frequency. The digit decoder 13 also has four conductors in path 316B to the low group oscillator 15, each conductor representing a different frequency. For each of the 12 possible inputs to digit decoder 13, the digit decoder 13 places a signal on one of the conductors in group 316A and on one of the conductors in group 316B, enabling high group oscillator 14 and low group oscillator 15 each to generate a signal of a particular frequency and when the two signals are combined, the resultant multi-frequency signal will be representative of a particular digit. The frequencies and digit signal coding may be that practiced in known multi-frequency signaling art.

It is pointed out that while the embodiment of the repertory dialer system described herein has been shown to be operative to generate multi-frequency signals, it is apparent that the coded digit pulses or the output of the decoder could be adapted to provide other digit signals, such as DC pulses.

Returning to FIG. 4, each storage module may provide a number of different sets of paths to route the digit pulses to the decoder 13 with a separate path provided in each set for each digit pulse. The conductors of each module are selectively interconnected as will be shown to provide a set of paths from input to output which establish a predetermined routing for the pulses which represents a stored directory number.

Recalling that the digit storage module 331 associated with pushbutton 1 is coded to provide a priority marking and directory number, such as P–419–486–8549, in FIG. 4, a pulse received from the output of flip-flop 233 (FIG. 2) of logic circuits 12 appears at the input to gate 303 and enables gate 303 to provide a ground at its output when the second input of gate 303 is a logic 1. A logic 0 or ground present at the output of gate 303 is extended over an input lead 401 via a connector 402 to an output lead designated "P" for a priority command.

The output of gate 304 due to a second pulse from flip-flop 234 of logic circuits 12 is extended over an input conductor 403 and connector 405 to an output conductor designated "4". Similarly, pulses appearing at gates (not shown) connected to input conductors 3–13 will also be routed through the matrix to one of the output conductors according to a pre-established coding or programming of the address storage module through the connectors such as connectors 402 and 405 so that consecutive pulses will appear on leads P–419–486–8549, respectively. Since in this case, the directory number has only eleven digits, three incoming conductors 12–14 are connected to a printed circuit conductor of the module designated OFF. Accordingly, conductor 14 is connected to a bus marked OFF via connector 408. Alternatively, conductor OFF maybe omitted.

Figure 6:
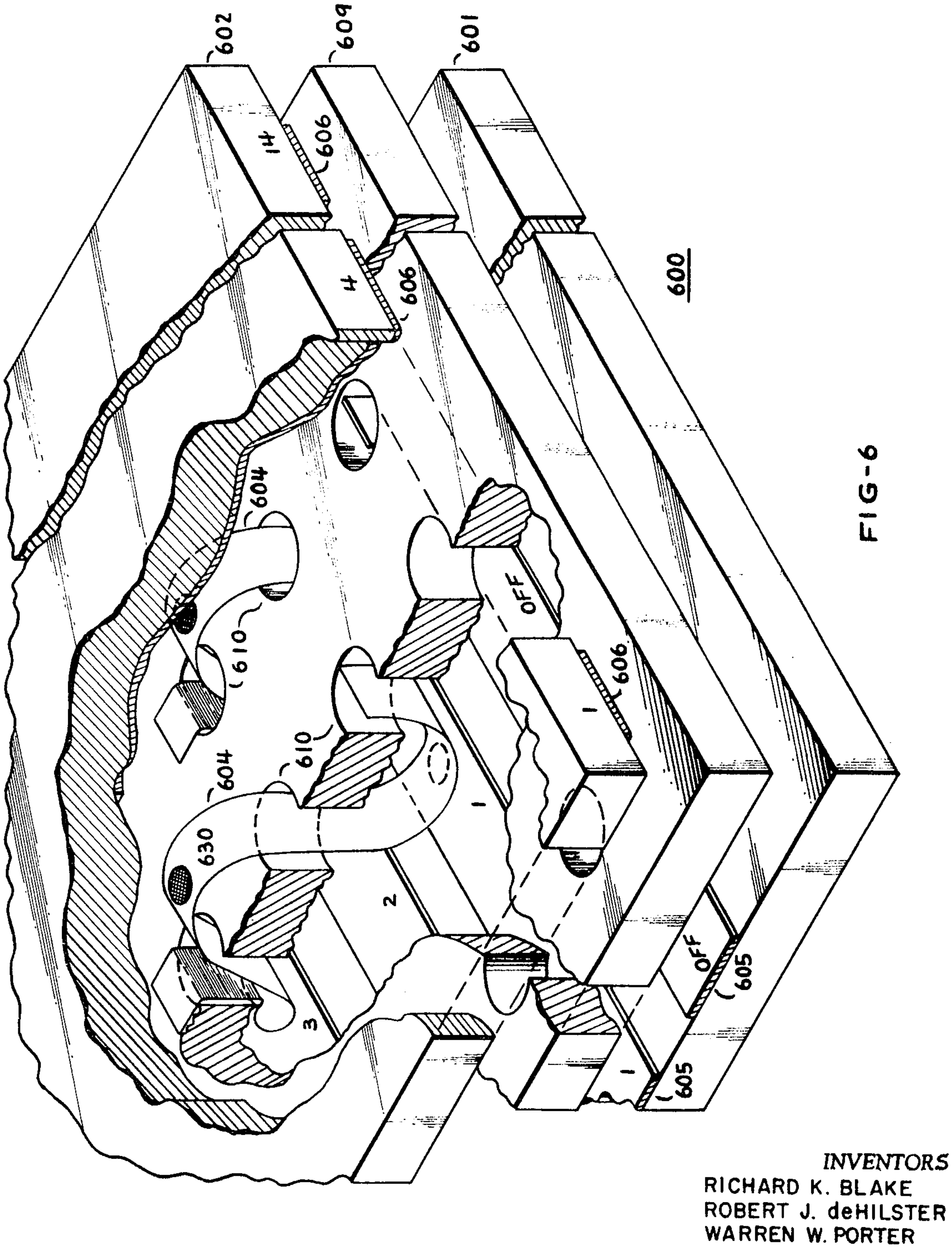
FIG. 6 is a partially sectioned isometric view of a digit storage module.

Referring briefly to FIG. 6, there is shown a mechanical arrangement for providing the pulse routing function described above. Each digit storage module includes a programmable board 609 for establishing a code symbolic of a particular directory number to be generated and priority command if required upon depressing of a pushbutton associated with the module. Each storage module also includes a pair of conductor bearing sheets 601 and 602 of an insulating material which may be, for example, circuit boards having conductors printed thereon. One of the sheets or boards, such as board 601 has a plurality of parallel conductors 605, which runs the length of the board and the other board 602 has a plurality of parallel conductors 606 disposed on a surface of the board 602 and extends in a direction perpendicular to the conductors 605 on the first board 601. Selected ones of the conductors on the two boards are interconnected by contact springs 604 set in apertures 610 of the programmable board 609 as will be described in detail hereinafter.

Figure 5B:
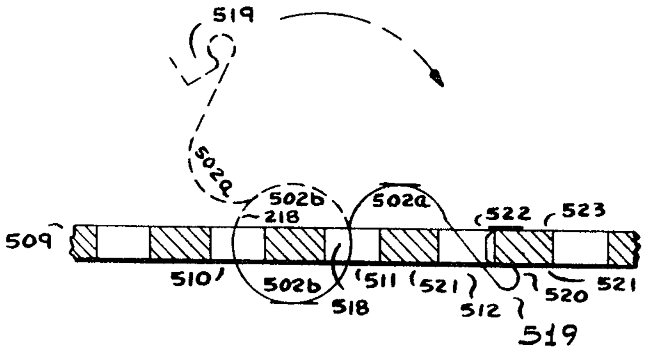
FIG. 5B is an enlarged view of a spring contact used to code a program card of a storage module to a digit of a directory number.
Figure 5A:
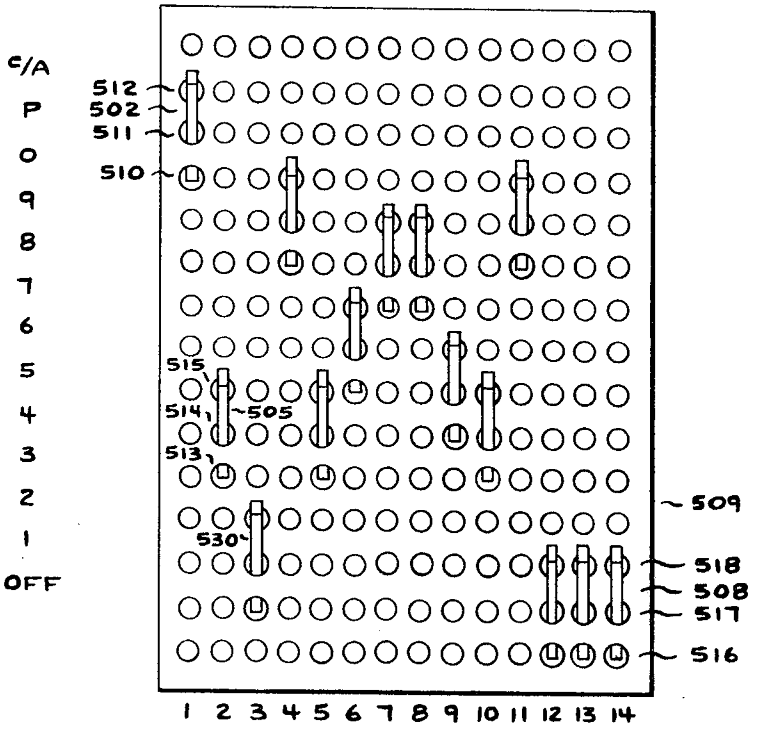
FIG. 5A is a plan view of a program card programmed to store an eleven digit directory number.

Referring to FIG. 5A, there is shown a view of a program board 509 of insulating material having contact springs or connectors, such as 502, 505 and 508, for providing an interconnection between designated conductors of the two sets of parallel conductors on a pair of conductor bearing boards, such as 601 and 602, of FIG. 6. The program board 509 has 14 rows of equally spaced holes, each row having a column of 15 equally spaced holes.

To program a telephone directory number and priority command on the board, contact springs, such as spring 502, is placed in selective sets of holes such as holes 510, 511, 512 of the program board 509. Each contact spring, such as spring 502 shown in FIG. 5B, comprises an S-shaped member of a resilient metal with each bowed portion **502*a* and 502*b*** serving as contacts to engage a conductor disposed on an underlying and overlying conductor bearing board when assembled.

The contact spring 502 is inserted in the program board in the following manner. First the spring is positioned adjacent apertures 510–512, as shown in phantom lines in FIG. 5B, with its end 518 in aperture 511. The spring is rotated clockwise until end 518 enters aperture 510. Then the other end 519, which is adjacent aperture 512, is pushed into aperture 512 until retaining portion 520 engages the lower surface 521 of the board 509. Retaining portion 522 of spring 502 engages the upper surface 523 of board 509 whereby the spring 502 is held in position.

Accordingly, when the code board 509 is assembled with conductor bearing sheets as shown for example by code board 609 of FIG. 6, a portion of the spring including contact portion **502*a*, sandwiched between a conductor board and the program board, will tend to push end 519 away from board 509. However, retainer portion 522 will prevent repositioning of the spring to an extent where the spring is released from the hole 512. Likewise, the retaining action of shoulder 520 will prevent release of the spring due to compression action of contact portion 502*b***.

Each contact spring threads a set of three holes, such as 510–512 of board 509 as shown in FIG. 5A, so that the two contact portions **502*a* and 502*b* of the spring are extending out from opposite sides of the board. Spring 502 has retaining portions 520 and 522 adjacent one end 519** which keep the spring firmly locked in position in the board.

The stored number can be altered by recoding the board to a different number. When spring contact is to be removed from certain set of holes, a slight pressure at point 510 flexing the spring toward the center of hole 512 will release the spring, as the end 519 of the spring comes out of hole 510. Contact portion 502b can then be threaded in reverse through hole 511 and the spring 502 removed from the set of holes 510–512 of the program board 509.

Referring again to FIG. 6, in a digit storage module assembly, the program board 609 with contact springs 604 inserted in appropriate holes of the program board 609 is sandwiched between the boards 601 and 602, board 602 having 14 parallel conductors 606, and board 601 having 13 parallel conductors which extend perpendicular to the conductors on board 602. The two boards 601 and 602 are assembled so that their conductor bearing surfaces face the program board. Each of the contact springs 604 selectively connects a conductor of board 601 to a conductor on board 602. The 14 conductors on board 602 represent the position of the 14 possible digits and the 13 conductors on board 601 represent the digital and priority values.

In the present example, while each directory number may have as many as 14 digits it is also possible to dial numbers having fewer than 14 digits. Thus in the example a 10 digit directory number preceded by a priority command, for example, P–419–468–8549, has been programmed on board 509. Referring to FIG. 5A, the board is programmed so that the first pulse on the lead designated 1 will be routed to the lead designated P for priority. Thus, a contact spring 502 (which is the same spring as 402 in FIG. 4) is placed between holes 510, 511 and 512 so that when the program board is assembled, the spring 502, shown in FIG. 5B, would have contact portion **502*a* in contact with a conductor connected to lead 1, and a contact portion 502*b* in contact with conductor marked P. Thus the pulse on lead 401 will be routed to conductor P via contact spring 502 and then to the decoder 13 (FIG. 3) over cable 326. It should be noted that the indications near the left and lower edges of 509 are the designations actually on 509 and that the indication P, for example, is placed a little higher than the P-conductor on the lower board. This is for the convenience of a service man who can position the portion 502*a* at the intersection of the P and 1** indicators.

Similarly, a second contact spring 505 placed between holes 513, 514, and 515 connects a conductor designated 2 to a second conductor designated as 4, the second digit of the stored directory number.

Similarly, the other 12 incoming pulses received over conductors 3–14 are routed to one of the digit conductors to be coded to represent a particular digit value. The last three pulses on leads 12–14 are not used in the illustrated example and are routed to a lead marked OFF. For example, the 14th pulse is routed from a conductor 14 to the lead OFF via the contact spring 508 in holes such as 516, 517 and 518.

The 13 leads designated C/A, P, and 1–0 outcoming from the storage board 509 are extended to a digit decoder 13, as shown in FIG. 3, schematically shown as over cable 326. Actually corresponding leads, such as P from each module 331, 332, . . . 339 can be connected together and run to digit decoder 13. Every time a particular digit is stored, a logic 0 present on a conductor incoming to the storage module, appears on the lead corresponding to that particular digit. The digit decoder assigns to every coded pulse digit one-out-of-three frequencies from a first oscillator 14 and one-out-of-four frequencies from a second oscillator 15. This dual frequency signal thus provided for each digit of a selected directory number is then sent over the leads 319 and 320 to a telephone line which is connected to a telephone switching center.

Figure 7:
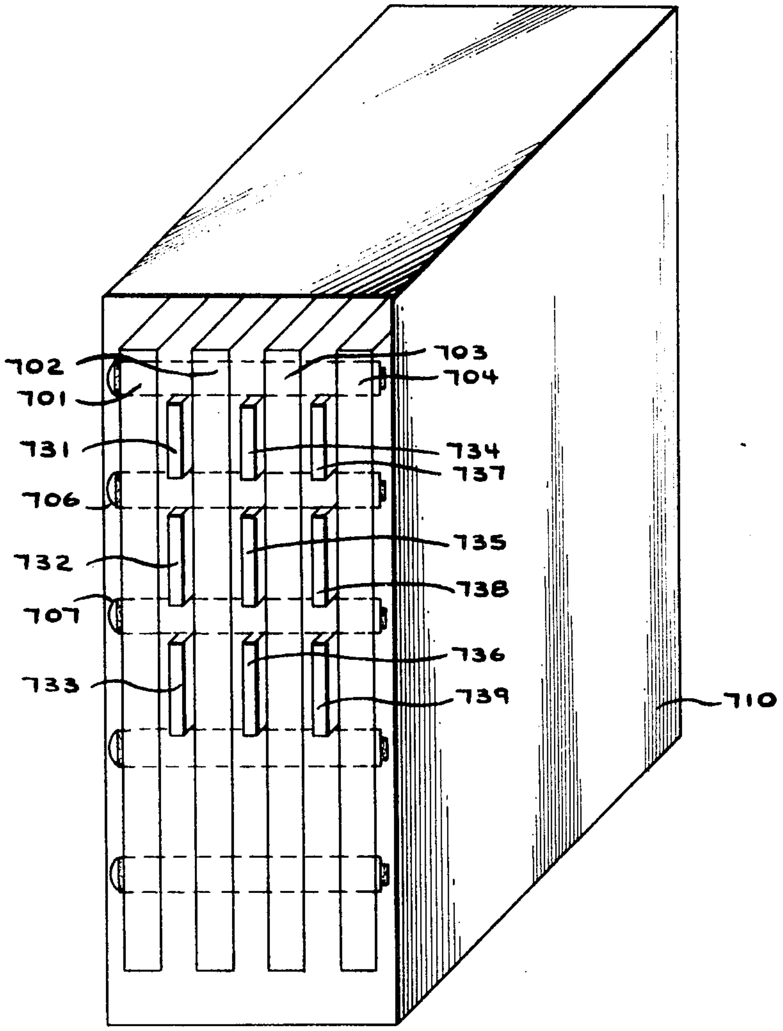
FIG. 7 is an isometric view of an assembly of stored address modules.

In actual practice, wherein a plurality of such modules are required, a pair of conductor bearing boards may be used to provide orthogonal sets of conductors for a number of program boards. Each program board is separated from the other by insulating spacers in between them. Thus, as shown in FIG. 7, an isometric view of an assembly in which nine program boards 731–739 separated into groups of three boards are placed between an adjacent pair of conductor bearing boards. Thus, program boards 731–733 are sandwiched between boards 701 and 702; program boards 734–736 are sandwiched between boards 702 and 703, and program boards 737–739 are sandwiched between boards 703 and 704. The program boards of each group, such as program boards 731–733 are separated from one another by spacers 706, 707.

In this assembly, the inner conductor bearing boards 702 and 703 would carry conductors on both sides. More specifically, boards 701, 702, and 703 each could carry on the right side thereof a set of vertical conductors C/A, P, 0–1, and OFF. Boards 702, 703, and 704 each could carry on the left side thereof three horizontal sets of conductors 1–14. The entire assembly may be arranged with printed circuit board edge connectors (not shown) for the printed circuit conductors whereby the entire assembly may be inserted into cooperating jacks (not shown) whereby connections to the circuitry of FIG. 3 is accomplished. In other words, the assembly may comprise a plug-in module for plugging into a larger circuit assembly. Alternatively, the entire assembly may be arranged in its own housing.

A feature of the repertory dialer relates to the operation of the pushbutton. If the operator depresses a button of the set 10 and holds it down beyond the time that it takes to send 14 digits, the same 14 digits should not be resent.

Therefore the combination of flip-flops 1–9, flip-flop 10, flip-flop 203, flip-flop 27, and associated gates provide the logic necessary to prevent resending.

Specifically, at the end of the 14th pulse, flip-flop 203 is reset via 134 and 138, flip-flops 11 and 27 are set via leads 229F and 229H. With 203 set, a logic "0" or ground is presented on line conductor 203A through contacts *b* of the still depressed button of set 10 and sent to circuit 128 via path 10E.

Figure 1C:
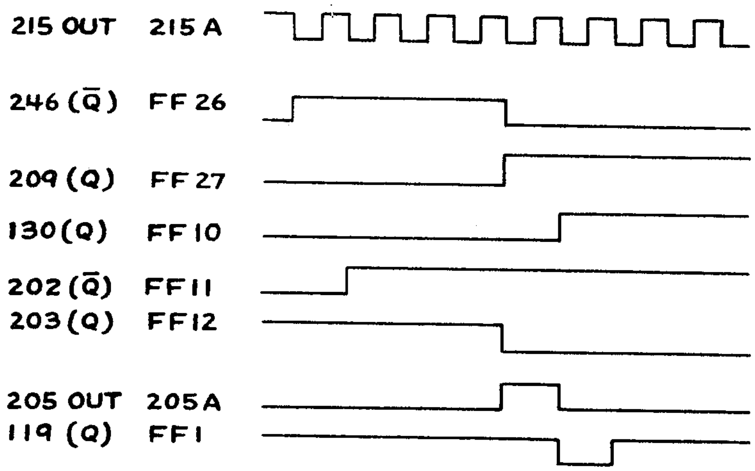
FIG. 1C is a timing diagram which relates to timing employed in preventing re-sending in case a pushbutton is held down beyond the sending of fourteen pulses.

At this time there is one pulse out of circuit 205, which resets flip-flop 1; but if the operator is still depressing the button, flip-flop 1 will set again at the next clock pulse. See FIG. 1C for timing diagram)

At the next clock pulse, flip-flop 10 will set again. The $\overline{Q}$ output of flip-flop 10 is presented to circuit 201; this disables the output on 205A. The system will remain in this condition, i.e. flip-flops 1, 10, and 27 set, until the operator removes his finger. During this time flip-flop 27 presents a logic "0" to circuit 132, preventing flip-flop 11 from resetting and starting the fourteen flip-flop pulse chain. When the operator releases the button, flip flop 10 resets. At the next pulse to flip flop 1, flip flop 1 will reset and finally flip flop 27.

The system is then completely idle as in the beginning.

We claim:

1. A telephone repertory dialing system for generating signals representative of the digits of a plurality of directory numbers, said system comprising pulse generating means for generating a group of pulses equal in number to the number of digits of a directory number, signal generating means, programmable pulse routing means including a plurality of input conductors a plurality of output conductors, and means for selectively interconnecting each input conductor with one of said output conductors, path select means connected between said pulse generating means and said input conductors, including a plurality of diodes each connected in series with one of said input conductors at the output of said path select means, said pulse routing means being operative to route each pulse generated by said pulse generating means to one of the inputs of a pulse decoding means over a separate path each of which paths represents a different digital value, said pulse decoding means connected to each digit output conductor of said pulse routing means and said signal generating means to provide frequency output signals representative of the digit signals extended thereto.

2. A telephone repertory dialing system as set forth in claim 1 in which said generating means includes a plurality of oscillator circuits for generating multifrequency signals for representing the digits of said selected directory number.

3. A telephone repertory dialing system for generating signals representative of a plurality of directory numbers, said system comprising pulse generating means for generating a plurality of pulses over outputs thereof, means including pulse decoding means and signal generating means responsive to said pulses for generating a like plurality of signals representative of digits of said directory numbers, pulse routing means including a plurality of matrices, each having a first conductor bearing support member having a group of input conductors, a second conductor bearing support member having a group of output conductors connected to provide pulse digit representing signals to said pulse decoding means, and a third support member carrying removable contact means for selectively interconnecting each input conductor with one of said output conductors to provide said digit representing signals, each of said matrices providing a different set of paths from input to output to provide a plurality of sets of paths over said plurality of matrices, each path of a set representing a digit and each path set representing digits of a directory number, and path set select means including a plurality of diodes each of which is connected in series between one of the outputs of said pulse generating means and an associated one of said input conductors to select said path set select means being operable to select a particular one of said path sets to route said pulses to said pulse decoding means whereby said plurality of signals represent digits of a selected one of said directory numbers.

4. A telephone repertory dialing system as set forth in claim 3 in which said path set selecting means includes a plurality of pushbuttons one associated with each path set for providing a control signal whenever one of said pushbuttons is depressed, and means responsive to said signal to route said pulses to a selected one of said path sets whenever the corresponding pushbutton is depressed.

5. A telephone repertory dialing system as set forth in claim 3 in which said path set selecting means includes separate access means for each matrix, each said access means being connected between said pulse generating means and one of said matrices, and means for enabling the access means for a selected one of said matrices whereby said pulses are gated to the input of said selected matrix.

6. A telephone repertory dialing system comprising; control means operative to provide first and second sets of control signals, pulse generating means responsive to a control signal of said first set to generate a plurality of sequential pulses over a plurality of outputs thereof, signal generating means, pulse decoding means responsive to each of said sequential pulses to provide enabling signals for said signal generating means, said signal generating means being responsive to said enabling signals to generate signals representative of digits of a plurality of directory numbers, pulse routing means for providing a plurality of sets of paths for said pulses between said pulse generating means and said pulse decoding means, each path of a set representing a digit and each path set representing digits of one of said directory numbers, and path set select means including logic gate means having a plurality of logic gates each having an input connected to a different output of said pulse generating means and an output and diode means including a plurality of diodes each connecting the output of one of said logic gates to a different path of each of said path sets, said logic gate means being responsive to a control signal of said second set to gate said sequential pluses to said pulse decoding means over the paths of a selected path set, whereby a set of digit representing pulses representative of a directory number selected to be dialed is provided over said paths to said pulse decoding means.

7. A telephone repertory dialing system as set forth in claim 6 in which said control means includes a plurality of pushbuttons each providing a gated signal when depressed, and logic circuit means connected to said pushbuttons and responsive to said gated signal to provide said first and second sets of control signals.

8. A telephone repertory dialing system as set forth in claim 6 in which said pulse routing means includes a group of input conductors connected to outputs of said logic gate means over said diode means, a group of output conductors connected to inputs of said pulse decoding means, and means for selectively connecting conductors of said input group with conductors of said output group.

9. A telephone repertory dialing system comprising control means including a plurality of pushbuttons each providing a gated signal when depressed, logic circuit means connected to said pushbuttons and responsive to said gated signal to provide first and second sets of control signals, pulse generating means responsive to a control signal of said first set to generate a plurality of sequential pulses, means including signal generating means and pulse decoding means responsive to each of said sequential pulses to generate signals representative of digits of a plurality of directory numbers, pulse routing means for providing a plurality of sets of paths for said pulses between said pulse generating means and said pulse decoding means, each path of a set representing a digit and each path set representing digits of one of said directory numbers, path set select means including logic gate means connected between said pulse generating means and said pulse routing means, and clock pulse generating means for generating a third set of control signals including means for providing a first clock pulse for enabling said logic circuit means, and means for providing a second clock pulse for enabling said pulse generating means and said logic gate means at a time after said logic circuit means have been enabled, said logic gate means being responsive to a control signal of said second set to gate said sequential pulses to said pulse decoding means over a selected one of said path sets, whereby a pulse code representative of a directory number selected to be dialed is established for said sequential pulses, and said signal generating means generates signals representing the digits of said selected directory number.

10. A repertory dialing system as set forth in claim 9 which includes inhibit means for normally extending an enabling potential to each of said pushbuttons and for applying a disabling potential to said pushbutton while said pulses are being generated by said pulse generating means.

11. A telephone repertory dialing system comprising; a plurality of pushbuttons each for selecting a different one of a plurality of directory numbers to be dialed and each providing a gated signal when depressed, logic circuit means connected to said pushbuttons and responsive to said gated signal to provide first and second control signals, pulse generating means responsive to said first control signal to generate a plurality of sequential pulses, encoding means responsive to said second control signal for encoding said sequential pulses with a digital value related to the digits of a directory number selected to be dialed, clock pulse generating means for generating a third set of control signals including means for providing a first clock pulse for enabling said logic circuit means and means for providing a second clock pulse for enabling said pulse generating means and said encoding means at a time after said logic circuit means are enabled, signal generating means responsive to said coded pulses to generate signals which represent the digits of said selected directory number, and inhibit means for inhibiting the generation of additional control signals whenever a pushbutton remains depressed beyond the cessation of pulses generated by said pulse generating means.

12. A telephone repertory dialing system for generating signals representative of directory numbers, said system comprising pulse generating means for generating a plurality of pulses over outputs thereof, means including pulse decoding means and signal generating means responsive to said pulses for generating a like plurality of signals representative of digits of said directory numbers, pulse routing means including a matrix having a first conductor bearing support member having a group of input conductors, a second conductor bearing support member having a group of output conductors connected to provide digit representing signals to said pulse decoding means, and a third support member carrying removable contact means for selectively interconnecting each input conductor with one of said output conductors to provide said digit representing signals, and path select means including a plurality of diodes each of which is connected in series between one of the outputs of said pulse generating means and an associated one of said input conductors, said path select means being operative to sequentially select a different one of said input conductors to route a pulse from said pulse generating means to said pulse decoding means whereby the plurality of signals thus routed over said sequentially selected inputs represent the digits of a selected one of said directory numbers.

13. A telephone repertory dialing system as set forth in claim 12 wherein said pulse routing means comprises an orthogonal matrix with the input conductors being disposed on said first conductor bearing member in a plurality of horizontal rows and the output conductors being disposed on said second conductor bearing sheet in a plurality of vertical columns.

* * * * *